(12) United States Patent
Izumisawa et al.

(10) Patent No.: US 11,350,016 B2
(45) Date of Patent: May 31, 2022

(54) INFORMATION PROCESSING APPARATUS, IMAGE FORMING APPARATUS, AND NON-TRANSITORY COMPUTER READABLE MEDIUM

(71) Applicant: FUJIFILM BUSINESS INNOVATION CORP., Tokyo (JP)

(72) Inventors: Yusuke Izumisawa, Kanagawa (JP); Toshihiro Iwafuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/986,675

(22) Filed: Aug. 6, 2020

(65) Prior Publication Data

US 2021/0289105 A1 Sep. 16, 2021

(30) Foreign Application Priority Data

Mar. 16, 2020 (JP) .............................. JP2020-045760

(51) Int. Cl.
*H04N 1/60* (2006.01)
*H04N 1/50* (2006.01)
*H04N 1/58* (2006.01)
*H04N 1/00* (2006.01)

(52) U.S. Cl.
CPC ....... *H04N 1/6002* (2013.01); *H04N 1/00411* (2013.01); *H04N 1/50* (2013.01); *H04N 1/58* (2013.01); *H04N 1/603* (2013.01)

(58) Field of Classification Search
CPC .... H04N 1/6002; H04N 1/00411; H04N 1/50; H04N 1/58; H04N 1/603
USPC ........................................ 358/3.27, 1.9, 1.15
See application file for complete search history.

(56) References Cited

U.S. PATENT DOCUMENTS

| 7,136,523 B2 | 11/2006 | Fukao et al. | |
| 7,706,605 B2 | 4/2010 | Fukao et al. | |
| 2004/0114166 A1* | 6/2004 | Kubo | H04N 1/54 358/1.9 |
| 2009/0310157 A1* | 12/2009 | Wada | H04N 1/6058 358/1.9 |

FOREIGN PATENT DOCUMENTS

| JP | 4261787 B2 | 4/2009 |
| JP | 4603665 B2 | 12/2010 |
| JP | 5994586 B2 | 9/2016 |

* cited by examiner

*Primary Examiner* — Quang N Vo
(74) *Attorney, Agent, or Firm* — Oliff PLC

(57) ABSTRACT

An information processing apparatus includes: a processor configured to execute a first smoothing process of smoothing a black component of a color conversion table, calculate other color components of the color conversion table using the black component for which the first smoothing process is executed, and execute a first update process of updating the color conversion table based on the black component for which the first smoothing process is executed and the calculated other color components.

20 Claims, 5 Drawing Sheets

INFORMATION PROCESSING APPARATUS, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-045760 filed Mar. 16, 2020.

BACKGROUND

1. Technical Field

The present disclosure relates to an information processing apparatus, an image forming apparatus, and a non-transitory computer readable medium.

2. Related Art

In related art, when an RGB color space image or a Lab color space image is converted into a YMCK color space image, if there is a large difference between grid points of a color conversion table, tone characteristics may be deteriorated. Various techniques for preventing generation of tone jump have been proposed, and examples thereof include a technique disclosed in JP-A-2003-116012. JP-A-2003-116012 discloses a technique for smoothing a color conversion table.

SUMMARY

However, when a color conversion table is smoothed, reproducibility of a color to be reproduced may be deteriorated even when the tone jump is prevented.

Aspects of non-limiting embodiments of the present disclosure relate to achieving both color reproducibility and tone characteristics.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a processor configured to execute a first smoothing process of smoothing a black component of a color conversion table, calculate other color components of the color conversion table using the black component for which the first smoothing process is executed, and execute a first update process of updating the color conversion table based on the black component for which the first smoothing process is executed and the calculated other color components.

BRIEF DESCRIPTION OF THE DRAWINGS

Exemplary embodiment(s) of the present disclosure will be described in detail based on the following figures, wherein.

DETAILED DESCRIPTION

Exemplary embodiments of the present disclosure will be described below with reference to the drawings.

A: First Exemplary Embodiment

Figure 1:
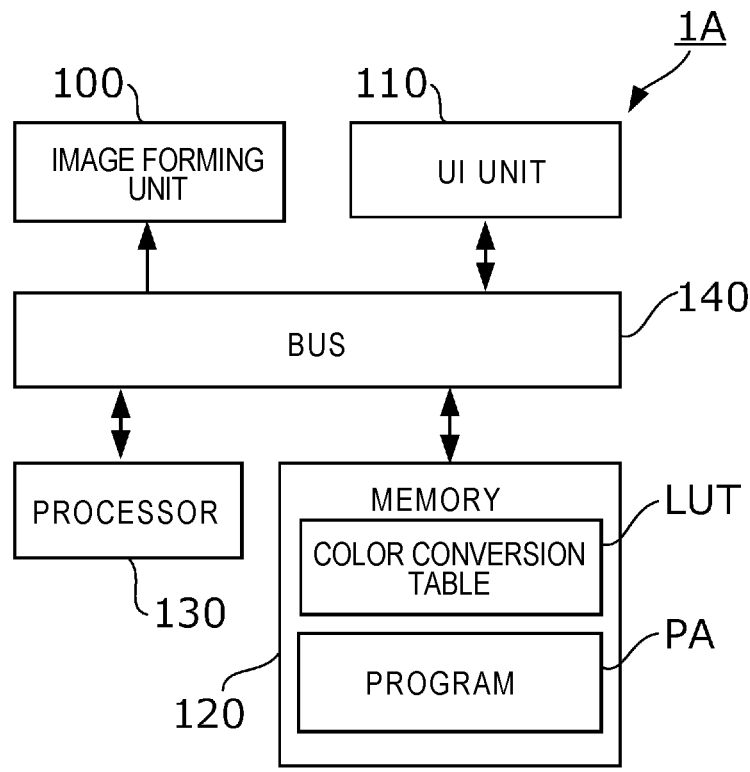
FIG. 1 is a diagram showing a configuration example of an image forming apparatus 1A according to a first exemplary embodiment of the present disclosure.

FIG. 1 is a diagram showing an example of an overall configuration of an image forming apparatus 1A according to a first exemplary embodiment of the present disclosure. The image forming apparatus 1A has a print function. The image forming apparatus 1A is, for example, a printer. It is noted that the image forming apparatus 1A is not limited to the printer. The image forming apparatus 1A may be an apparatus having at least one of a copy function, a scan function, or a facsimile function in addition to the print function. As shown in FIG. 1, the image forming apparatus 1A includes an image forming unit 100, a UI unit 110, a memory 120, a processor 130, and a bus 140 that mediates data transfer among these elements.

Under control of the processor 130, based on image data acquired by the processor 130, the image forming unit 100 forms and outputs an image represented by the image data on a recording medium such as a print sheet. The image forming unit 100 forms the image by, for example, an electrophotographic process.

The UI unit 110 includes a display device such as a liquid crystal display, and a touch sensor such as a pressure-sensitive sensor or an electrostatic sensor formed in a transparent sheet shape. In FIG. 1, the display device and the touch sensor are not shown. The display device displays various screens under the control of the processor 130. An example of the screen displayed on the display device is a UI screen that prompts a user to use the image forming apparatus 1A. The touch sensor is attached to the display device so as to cover a display region of the display device. The display device and the touch sensor function as a so-called touch panel under the control of the processor 130. The UI unit 110 accepts an operation of the user such as a touch operation and a scroll operation on the display screen of the display device, and outputs data corresponding to an operation content of the user to the processor 130. Thus, the operation content of the user is transmitted to the processor 130.

Although not shown in detail in FIG. 1, the memory 120 includes a volatile memory such as a random access memory (RAM) and a video RAM (VRAM), and a nonvolatile memory such as a read only memory (ROM) and a flash memory. The volatile memory is a memory whose stored content is lost when power is not supplied. The nonvolatile memory is a memory whose stored content is maintained even when power is not supplied. The nonvolatile memory stores (i) setting data representing a content of various settings for the image forming apparatus 1A and (ii) a color conversion table LUT. The memory 120 may include a solid state drive, a hard disk drive, and the like.

The color conversion table LUT associates a device-independent color space with a device-dependent color space. In the present exemplary embodiment, the device-independent color space is a Lab color space, and the device-dependent color space is a YMCK color space. The color conversion table LUT is a table that stores, in association with points in a three-dimensional space defined by coordinate axes corresponding to components of L, a, and b, values of Y, M, C, and K when colors corresponding to the points (that is, colors represented by values of L, a, and b at the points) are represented by a combination of Y, M, C, and K.

The color conversion table LUT does not store combinations of the values of Y, M, C, and K for all points in the three-dimensional space. In the present exemplary embodiment, only for 33×33×33=35,937 grid points regularly arranged in the three-dimensional space, the color conversion table LUT stores the combinations of the values of Y, M, C, and K in association with coordinates of the grid points (that is, the respective values of L, a, and b). When color conversion is performed using the color conversion table LUT, points other than the grid points are obtained by an interpolation operation based on the values of Y, M, C, and K stored in association with the grid points.

Figure 2:
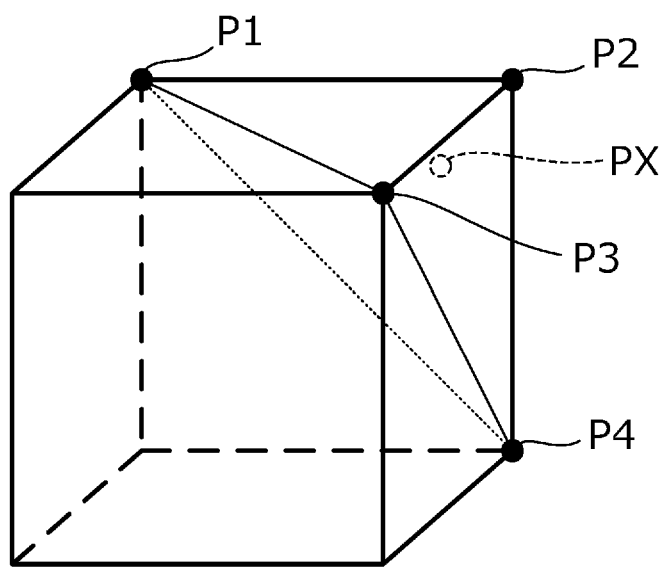
FIG. 2 is a diagram showing an interpolation operation executed in the image forming apparatus 1A.

For example, it is assumed that the color conversion table LUT stores information on grid points P1, P2, P3, and P4 in the three-dimensional space. In this case, when the color conversion is performed for a color corresponding to a point PX located inside a triangular pyramid having vertices of the grid points P1, P2, P3, and P4 as shown in FIG. 2, the combination of the values of Y, M, C and K colors corresponding to the point PX is calculated by inputting the values of Y, M, C and K at each of the grid points P1, P2, P3 and P4 to a predetermined interpolation function.

In the present exemplary embodiment, the color conversion table LUT is stored in the memory 120 in advance. Alternatively, the color conversion table LUT may be generated as appropriate by a known method and stored in the memory 120. For example, when the image forming apparatus 1A has a scanner function, the image forming apparatus 1A may generate the color conversion table LUT in the following manner. That is, the image forming apparatus 1A causes the image forming unit 100 to output a recording medium on which images of color patches for combinations of Y, M, C, and K are formed, and reads the image of the color patch with the scanner function, to obtain values of L, a, and b. During generation of the color conversion table LUT, a user may specify a type of the device-independent color space, the number of grid points to be set in the color space, a type of the recording medium on which the images of the color patches are formed, and the like.

If there is a large difference between the grid points in the color conversion table generated in the above manner, color conversion of a gradation image including high saturation and low lightness colors may deteriorate tone characteristics. For example, it is assumed that values of K at the grid points P1, P2, P3, and P4 in FIG. 2 are 20, 25, 15, and 70.

Figure 3:
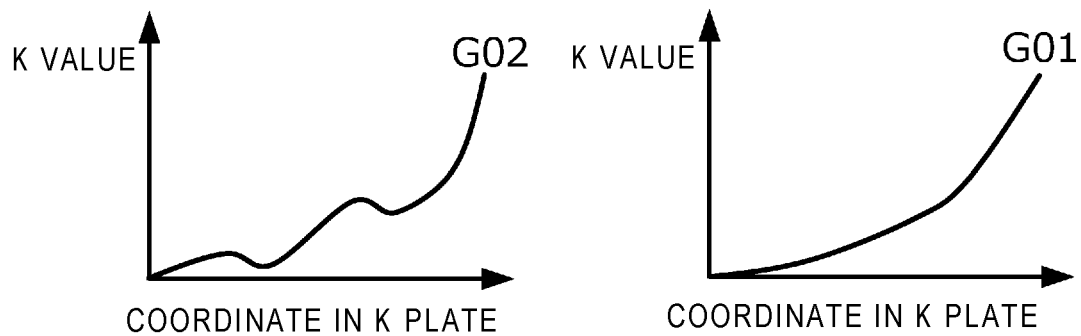
FIG. 3 is a diagram showing a problem of related art.

In this case, the value of K at the point PX calculated by the interpolation operation is larger due to influence of the value of K at the grid point P4. When the color conversion is performed for the gradation image including high saturation and low lightness colors using such a color conversion table, in a K plate in which originally the K value is to monotonically change as shown in a graph G01 in FIG. 3, the K value suddenly increases or decreases as shown in a graph G02 in FIG. 3 and is seen as tone jump. Since the K plate has the largest color difference from white which is a ground color of a general sheet, the sudden increase or decrease (hereinafter, which will be referred to as a "sharp change") in the K-value is likely to be seen as the jump.

When smoothing is performed on the overall color conversion table in order to prevent the sharp change of the K plate described above, a difference occurs between a converted color and a target color, and the color reproducibility is deteriorated. The nonvolatile memory of the image forming apparatus 1A stores in advance a program PA that causes the processor 130 to execute a process of updating the color conversion table LUT so as to achieve both color reproducibility and tone characteristics. The processor 130 uses the volatile memory as a work area when executing the program PA.

The processor 130 is, for example, a central processing unit (CPU). The processor 130 reads the program PA into the volatile memory of the memory 120 in response to an instruction to update the color conversion table LUT which is given by an operation on the touch panel of the UI unit 110, and starts execution of the program PA.

Figure 4:
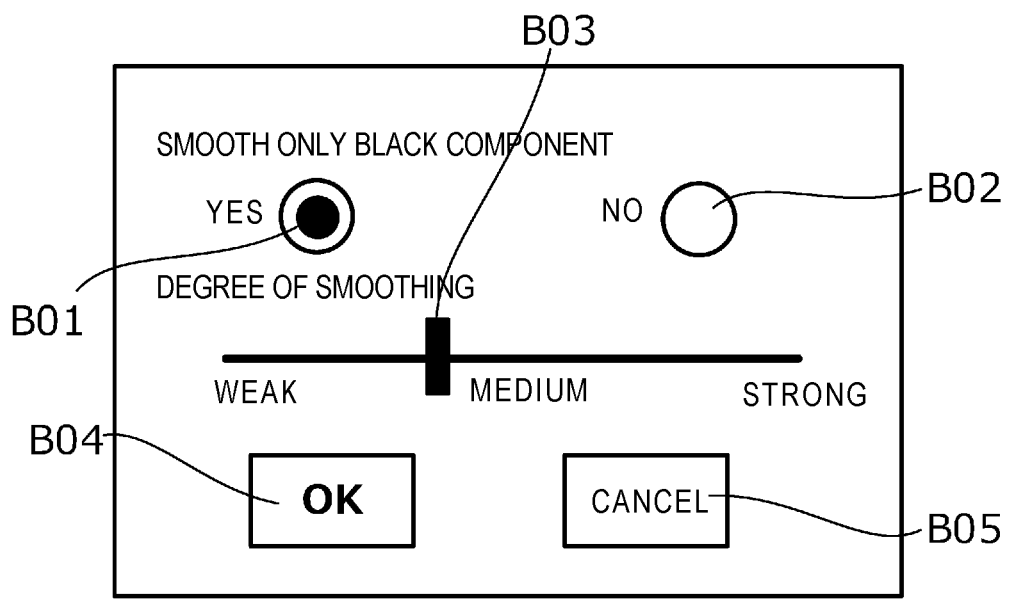
FIG. 4 is a diagram showing an example of a UI screen displayed on a UI unit 110 of the image forming apparatus 1A.

The processor 130, which has started executing the program PA, causes the display device of the UI unit 110 to display the UI screen shown in FIG. 4. The UI screen is a screen that accepts an instruction from the user. The UI screen includes a radio button B01, a radio button B02, a slider B03, an OK button B04, and a cancel button B05. The radio button B01 is a virtual operator that allows the user to instruct execution of smoothing of only a black component among Y, M, C, and K. The details of the "smoothing of the black component" will be described later. The radio button B02 is a virtual operator that allows the user to instruct non-execution of the smoothing of only the black component.

The slider B03 is a virtual operator that allows the user to instruct a degree of smoothing of the black component. In the present exemplary embodiment, the user of the image forming apparatus 1A can specify any one of three types of "weak", "medium", and "strong" as the degree of smoothing of the black component. The "degree of smoothing of the black component" will be clarified later. The OK button B04 is a virtual operator that allows the user to instruct execution of an update of the color conversion table LUT. The cancel button B05 is a virtual operator that allows the user to instruction cancellation of the update of the color conversion table LUT.

In the present exemplary embodiment, when the cancel button B05 is selected by an operation on the UI unit 110 or when the radio button B02 is selected and the OK button B04 is selected, the processor 130 ends the execution of the program PA without updating the color conversion table LUT. When the radio button B02 is selected and the OK button B04 is selected, smoothing of all color components of Y, M, C, and K may be executed by the processor 130 in the same manner as in the related art.

Figure 5:
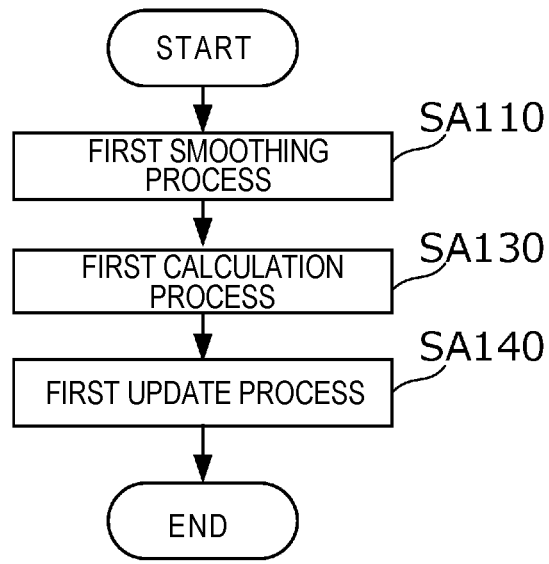
FIG. 5 is a flowchart of a process that a processor 130 of the image forming apparatus 1A executes in accordance with a program PA.

On the other hand, when the radio button B01 is selected and the OK button B04 is selected, the processor 130 sets each of the 33×33×33=35,937 grid points for which the color conversion table LUT stores the corresponding values of Y, M, C, and K as a grid point to be processed, and executes a process shown in a flowchart in FIG. 5 according to the program PA. As shown in FIG. 5, the process executed by the processor 130 operating in accordance with the program PA includes a first smoothing process, a first calculation process, and a first update process.

In the first smoothing process, the processor 130 smooths a black component value K1 (hereinafter, also simply referred to as a "black component K1") stored in the color conversion table LUT in association with the grid point to be processed (step SA110). The smoothing of the black component may be performed by a weighted average. More specifically, the smoothing of the black component may be performed by replacing the black component of the grid point to be processed with a weighted average value of the black component and black components of other grid points located around the grid point to be processed. Here, a specific example of the other grid points located around the grid point to be processed is given as follows. It is assumed that the grid points to be processed is a center of twenty seven (27) grid points that are three points in an L-axis direction by three points in an a-axis direction by and three points in a b-axis direction. In this case, the other grid points around the grid point to be processed are twenty six (26) other grid points. The "degree of smoothing of the black component" specified by the operation of the slider B03 is related to a weight coefficient for calculating the weighted average value.

Specifically, when "medium" is specified by the operation of the slider B03, the weight coefficient of the grid point to be processed is set to 0.5, and a weight coefficient of the other grid points around the grid point to be processed is set to 0.5/(the number of other grid points). When "strong" is specified by the operation of the slider B03, the weight coefficient of the grid point to be processed is set to 0.2, and the weight coefficient of the other grid points around the grid point to be processed is set to 0.8/(the number of other grid points). In this case, contribution of the black components of the other grid points around the grid point to be processed to the weighted average value is larger than that in the case where "medium" is specified. On the other hand, when "weak" is specified by the operation of the slider B03, the weight coefficient of the grid point to be processed is set to 0.8, and the weight coefficient of the other grid points around the grid point to be processed is set to 0.2/(the number of other grid points). In this case, the contribution of the black components of the other grid points around the grid point to be processed to the weighted average value is smaller than that in the case where "medium" is specified.

In the present exemplary embodiment, the degree of smoothing of the black component is adjusted by adjusting the weight coefficient for calculating the weighted average value. Alternatively, the degree of smoothing may be adjusted by adjusting a range of the other grid points or the number of other grid points in calculating the weighted average value. For example, when "strong" is specified by the operation of the slider B03, the range of the other grid points may be widened, and when "weak" is specified by the operation of the slider B03, the range of the other grid points may be narrowed.

In the first calculation process, the processor 130 uses a black component K2 calculated in the first smoothing process to calculate the other color components corresponding to the grid point to be processed in the device-dependent color space, that is, the color components of Y, M and C of the grid point to be processed (step SA130). More specifically, in the first calculation process, the processor 130 calculates the value of each color component of Y, M, and C based on (i) the values of L, a, and b of the grid point to be processed and (ii) the black component K2 calculated in the first smoothing process. In the first update process, the processor 130 updates each value of Y, C, M, and K corresponding to the grid point to be processed in the color conversion table LUT using the black component K2 calculated in the first smoothing process and Y, M, and C calculated in the first calculation process (step SA140).

According to the present exemplary embodiment, since the black component stored in the color conversion table LUT is already smoothed, the tone characteristics in the color conversion of the gradation image including a high saturation and low lightness color is improved. Furthermore, according to the present exemplary embodiment, since each color component of Y, M, and C corresponding to the grid point to be processed is calculated based on (i) the smoothed black component of the grid point to be processed and (ii) the values of L, a, and b corresponding to the grid point to be processed, the color reproducibility (degree of matching with a target color) is ensured as compared with a case where the smoothing is applied to all colors of Y, M, C, and K. As described above, according to the present exemplary embodiment, it is possible to improve the tone characteristics while maintaining the color reproducibility.

B: Second Exemplary Embodiment

Figure 6:
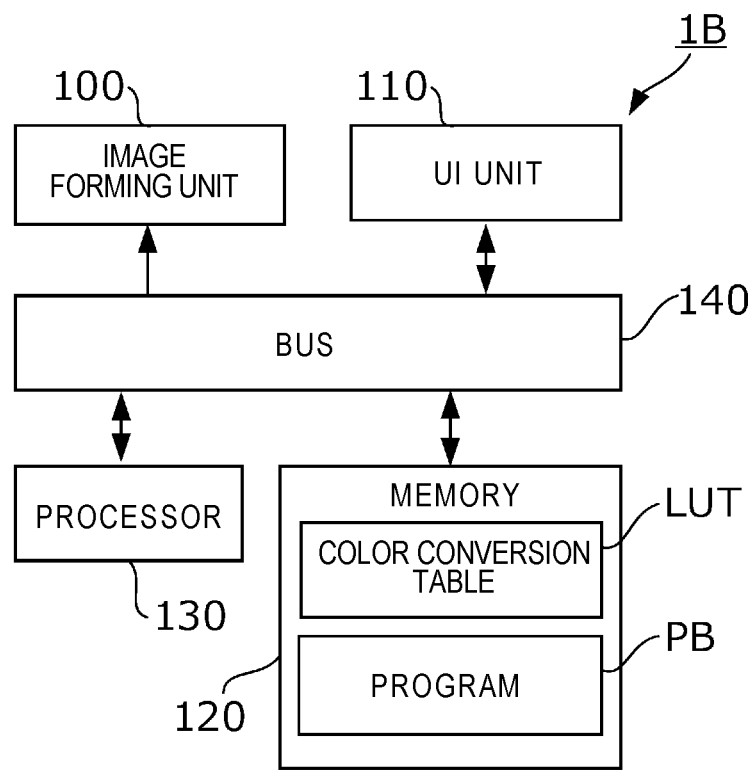
FIG. 6 is a diagram showing a configuration example of an image forming apparatus 1B according to a second exemplary embodiment of the present disclosure.

FIG. 6 is a diagram showing a configuration example of an image forming apparatus 1B according to a second exemplary embodiment of the present disclosure. In FIG. 6, the same elements as those in FIG. 1 are denoted by the same reference numerals. As is clear from comparison between FIG. 6 and FIG. 1, a hardware configuration of the image forming apparatus 1B is the same as the hardware configuration of the image forming apparatus 1A. A difference between the image forming apparatus 1A and the image forming apparatus 1B is that a program PB is stored in the memory 120 instead of the program PA. Hereinafter, the program PB, which is a difference between the first exemplary embodiment and the second exemplary embodiment, will be mainly described.

Figure 7:
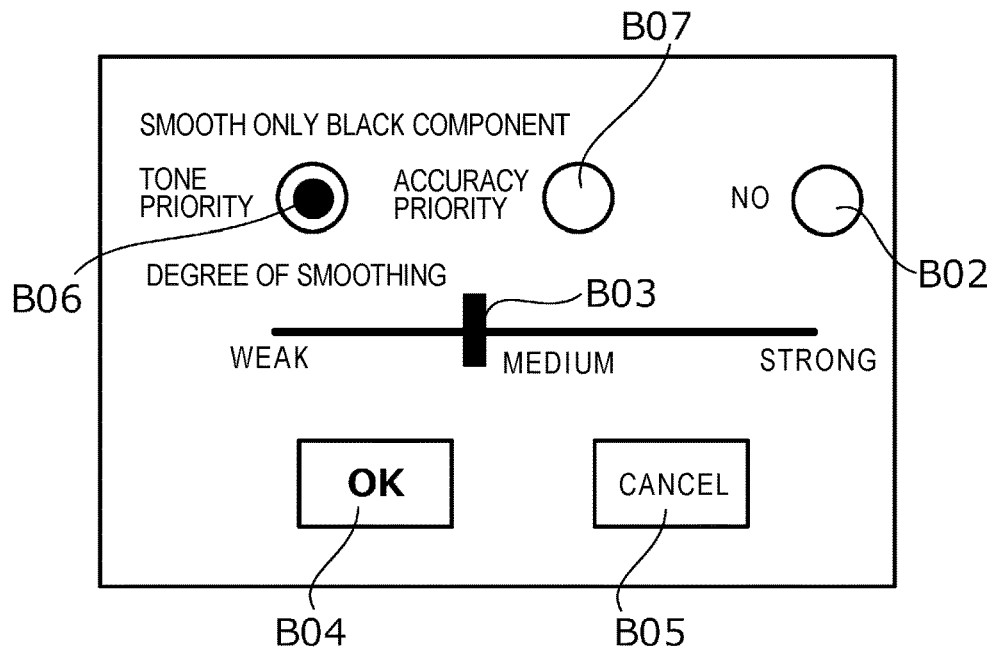
FIG. 7 is a diagram showing an example of a UI screen displayed on a UI unit 110 of the image forming apparatus 1B.

The processor 130 of the image forming apparatus 1B reads the program PB into the volatile memory in response to an instruction to update the color conversion table LUT by an operation on the touch panel of the UI unit 110, and starts execution of the program PB. The processor 130, which has started executing the program PB, causes the display device of the UI unit 110 to display the UI screen shown in FIG. 7. The UI screen shown in FIG. 7 is also a screen that accepts an instruction from the user as in the UI screen shown in FIG. 4. In FIG. 7, the same elements as those in FIG. 4 are denoted by the same reference numerals. As is clear from comparison between FIG. 7 and FIG. 4, the UI screen according to the present exemplary embodiment is different from the UI screen of the first exemplary embodiment in that a radio button B06 and a radio button B07 are provided instead of the radio button B01. The radio button B06 is a virtual operator that allows the user to instruct tone-characteristics priority when updating the color conversion table LUT. The radio button B07 is a virtual operator that allows the user to instruct color-accuracy priority, that is, color-reproducibility priority when updating the color conversion table LUT.

In the present exemplary embodiment, when the radio button B07 is selected and the OK button B04 is selected, the processor 130 sets each grid point for which the color conversion table LUT stores color components of Y, M, C, and K as the grid point to be processed, and executes the process shown in the flowchart in FIG. 5 according to the program PB. On the other hand, when the radio button B06 is selected and the OK button B04 is selected, the processor 130 executes a process shown in a flowchart in FIG. 8 for each grid point to be processed according to the program PB.

Figure 8:
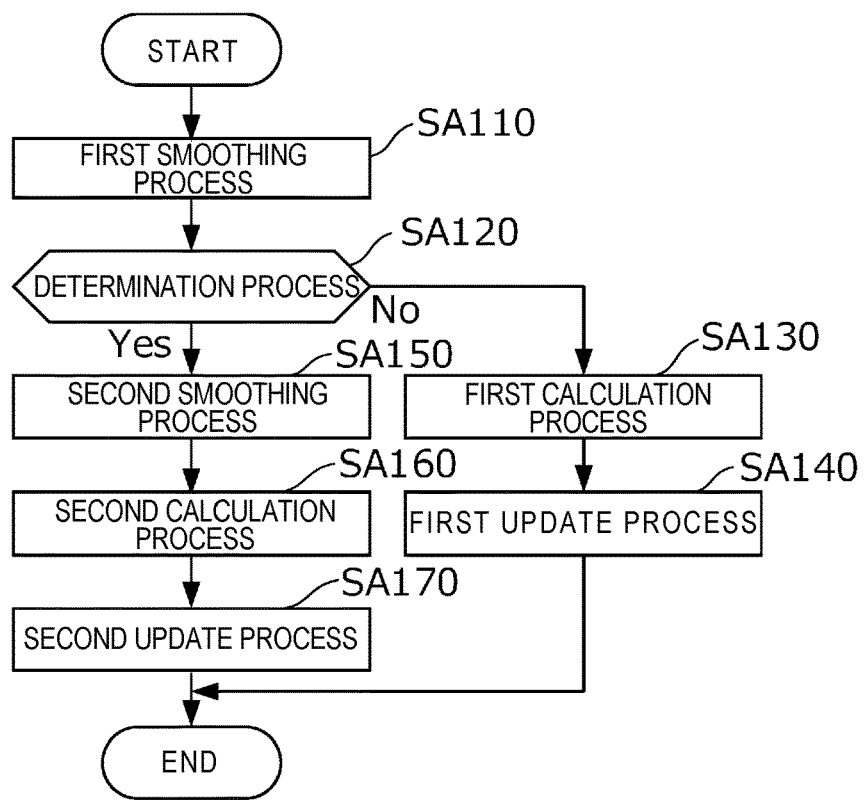
FIG. 8 is a flowchart of a process that a processor 130 of the image forming apparatus 1B executes in accordance with the program PA.

In FIG. 8, the same processes as those in FIG. 5 are denoted by the same reference numerals. As is clear from comparison between FIG. 8 and FIG. 5, the process shown in the flowchart in FIG. 8 is different from the process shown in the flowchart in FIG. 5 in that a determination process, a second smoothing process, a second calculation process, and a second update process are provided. Hereinafter, the determination process, the second smoothing process, the second calculation process, and the second update process that are differences between the first exemplary embodiment and the second exemplary embodiment will be described.

The determination process is a process executed following the first smoothing process. In the determination process, the processor 130 determines whether the black component K2 calculated in the first smoothing process is smaller than the black component K1 before smoothing (step SA120). As shown in FIG. 8, when a determination result of the determination process is "No", the processor 130 executes the first calculation process and the first update process. On the other hand, when the determination result of the determination process is "Yes", the processor 130 executes the second smoothing process, the second calculation process, and the second update process.

In the second smoothing process, the processor 130 smooths the other color components (that is, the color components of Y, M, and C) stored in the color conversion table LUT in association with the grid point to be processed (step SA150). Smoothing of the other color components may also be performed by the weighted average. Hereinafter, the other color components before smoothed by the second smoothing process are represented by "Y1, M1, and C1", and the other color components after smoothed are represented by "Y2, M2, and C2".

In the second calculation process, the processor 130 uses a first color component that is the smallest among the other color components calculated in the second smoothing process and the black component K2 calculated in the first smoothing process to calculate components excluding the first color component and the black component (step SA160). For example, if Y2 is the smallest among Y2, M2, and C2, the processor 130 calculates values M3 and C3 of the remaining color components based on (i) the values of L, a and b of the grid point to be processed, (ii) the black component K2 calculated in the first smoothing process, and (iii) Y2 calculated in the second smoothing process.

In the second update process, the processor 130 updates each of the values of Y, C, M, and K corresponding to the grid point to be processed in the color conversion table LUT using (i) the first color component (for example, Y2), (ii) the black component K2 calculated in the first smoothing process, and (iii) the color components (for example, M3 and C3) calculated in the second calculation process (step SA170).

A reason why the process is branched depending on whether the black component K2 calculated in the first smoothing process is smaller than the black component K1 before smoothing is as follows. When the first calculation process is unconditionally executed when the black component decreases due to the smoothing, other color components are calculated to be larger in order to compensate for the decrease in the black component. When the color conversion is performed on, for example, a purple monochromatic gradation image using the color conversion table LUT which is updated in accordance with this calculation result, a complementary color (for example, Y for C) is output to be larger, and an increase in the complementary color can be visually recognized as the tone jump. The reason why the process is branched depending on whether the black component K2 calculated in the first smoothing process is smaller than the black component K1 before the smoothing is to avoid an occurrence of the tone jump due to the increase in the complementary color. The reason why the second smoothing process is executed when the determination result of the determination process is "Yes" is to avoid that the second calculation process calculates the other color components using the first color component that sharply changes.

In the present exemplary embodiment, when the black component does not decrease even after smoothing, the same process as in the first exemplary embodiment (that is, the first calculation process and first update process) is executed, and the same effect as that of the first exemplary embodiment is obtained. In addition, in the present exemplary embodiment, when the black component is smaller than the original due to the smoothing, it is possible to prevent an increase in the color component that is to be the smallest among the other color components, and to improve the tone characteristics in the color conversion of the monochromatic gradation image in which the color component which is to be the smallest is a complementary color, as compared with the first exemplary embodiment. In this case, since the color component which is to be the smallest is not increased, the color reproducibility is deteriorated as compared with the first exemplary embodiment. As described above, according to the present exemplary embodiment, it is also possible to update the color conversion table LUT so as to achieve both color reproducibility and tone characteristics.

C: Modifications

The exemplary embodiments of the present disclosure have been described above. The above exemplary embodiments may be modified as in the following modifications. Plural modifications may be combined.

First Modification

Figure 9:
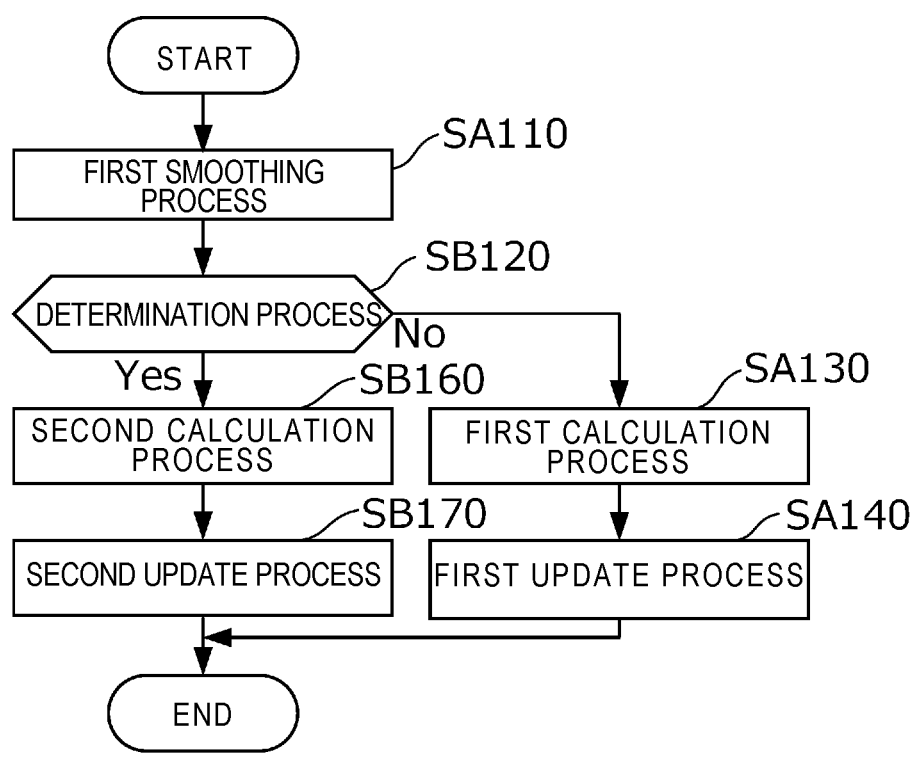
FIG. 9 is a flowchart of a process according to a first modification.

In the second exemplary embodiment, when the radio button B06 is selected and the OK button B04 is selected, the processor 130 executes the process shown in the flowchart in FIG. 8 for each grid point to be processed. However, a process shown in a flowchart in FIG. 9 may be executed by the processor 130 instead of the process shown in the flowchart in FIG. 8. In FIG. 9, the same processes as those in FIG. 8 are denoted by the same reference numerals. The process shown in the flowchart in FIG. 9 includes the first smoothing process, a determination process, the first calculation process, the first update process, a second calculation process, and a second update process. The following description will focus on the determination process, the second calculation process, and the second update process, which are differences between the second exemplary embodiment and the first modification.

The determination process is a process executed following the first smoothing process. In the determination process, the processor 130 determines whether the black component K2 calculated in the first smoothing process is smaller than the black component K1 before smoothing and there is at least one second color component that is less than a threshold value among the other color components stored in the color conversion table LUT in association with the grid point to be processed (step SB120). As shown in FIG. 9, when a determination result of the determination process is "No", the processor 130 executes the first calculation process and the first update process. On the other hand, when the determination result of the determination process is "Yes", the processor 130 executes the second calculation process and the second update process.

In the second calculation process, the processor 130 uses the second color component and the black component K2 calculated in the first smoothing process to calculate components excluding the second color component and the black component of the color conversion table LUT (step SB160). For example, it is assumed that the second color component is Y and a value thereof is Y1. In this case, the processor 130 calculates M2 and C2 using the second component (Y1) and the black component K2. In the second update process, the processor 130 updates the color conversion table LUT based on the second color component Y1, the black component K2 for which the first smoothing process is executed, and the color components (M2 and C2) calculated in the second calculation process (step SB170).

According to this modification as well, the tone jump is prevented by smoothing the black component of the color conversion table LUT. In addition, according to this modification, when there is at least one second color component that is less than the threshold value among the color components other than the black component of the color conversion table LUT, the second color component and the black component K2 calculated in the first smoothing process are used to calculate the component excluding the second color component and the black component of the color conversion table LUT, and the color conversion table LUT is updated based on the second color component, the black component K2, and the calculated color component. According to this modification as well, similarly to the second exemplary embodiment, it is possible to ensure the tone characteristics while sacrificing the color reproducibility. That is, according to the present exemplary embodiment as well, it is possible to achieve both color reproducibility and tone characteristics. When the threshold value is a sufficiently small value or when the color corresponding to the grid point to be processed is a color that does not need the second color component, the processor 130 may sets the second color component to 0 and executes the second calculation process.

Second Modification

In the determination process of the first exemplary embodiment and the second exemplary embodiment, it is determined whether the black component K2 calculated in the first smoothing process is smaller than the black component K1 before smoothing. Alternatively, a determination content of the determination process may be changed to whether "the black component K2 that is smoothed by the first smoothing process is smaller than the black component K1 before smoothing and a difference δ between the black component K1 before smoothing and the smoothed black component K2 is equal to or greater than a predetermined value". According to this modification, if a decrease amount δ of the black component due to the smoothing is less than the predetermined value (that is, if the decrease amount of the black component due to the smoothing is small), the process cannot be branched, whereas if the decrease amount of the black component is equal to or greater than the predetermined value, the process can be branched.

Third Modification

In each of the above exemplary embodiments, the processor 130 starts the execution of the process (that is, the process shown in the flowchart in FIG. 5 or FIG. 8) that remarkably indicates features of the present disclosure in response to the operation on the UI screen. However, displaying of the UI screen may be omitted, and after the execution of the program PA (or the program PB) is started, the processor 130 may immediately start executing the process shown in the flowchart in FIG. 5 or FIG. 8.

Fourth Modification

In the first exemplary embodiment and the second exemplary embodiment, examples in which the present disclosure is applied to the image forming apparatus have been described. It is noted that an application target of the present disclosure is not limited to the image forming apparatus, but may be an information processing apparatus including a processor that executes the following process. The processor of the information processing apparatus executes the first smoothing process of smoothing the black component of the color conversion table, calculates the other components of the color conversion table using the black component for which the first smoothing process is executed, and executes the first update process of updating the color conversion table based on (i) the black component for which the first smoothing process is executed and (ii) the calculated other components. The processor of the information processing apparatus is not limited to a CPU, and may be a graphics processing unit (GPU), an application specific integrated circuit (ASIC), a field-programmable gate array (FPGA), a programmable logic device, and the like.

In the embodiments above, the term "processor" is broad enough to encompass one processor or plural processors in collaboration which are located physically apart from each other but may work cooperatively. The order of operations of the processor is not limited to one described in the embodiments above, and may be changed.

Fifth Modification

A program may be manufactured or sold alone to cause a computer having a processor to execute a step of executing the first smoothing process of smoothing the black component of the color conversion table, a step of calculating the other components of the color conversion table using the black component for which the first smoothing process is executed, and a step of executing the first update process of updating the color conversion table based on the black component for which the first smoothing process is executed and the calculated other components. Specifically, the program may be written in a computer-readable recording medium for sale, or the program may be sold by downloading via an electric communication line such as the Internet.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a hardware processor configured to
execute a first smoothing process of smoothing a first black component of a first grid point of a color conversion table, the first smoothing processing including replacing the first black component with a second black component that is a weighted average value of (i) the first black component and (ii) other black components of other grid points located around the first grid point,
calculate other color components of the color conversion table for the first grid point based on the second black component, and
execute a first update process of updating the color conversion table based on the second black component and the calculated other color components.

2. The information processing apparatus according to claim 1, wherein
the processor is configured to, when the first black component of the color conversion table is decreased due to the first smoothing process,
execute a second smoothing process of smoothing the other color components of the color conversion table,
use (i) a first color component that is a smallest among the other color components for which the second smoothing process is executed and (ii) the second black component to calculate a component of the color conversion table excluding the first color component and the second black component, and
execute a second update process of updating the color conversion table based on the first color component, the second black component, and the calculated component.

3. The information processing apparatus according to claim 1, wherein
the processor is configured to, when the first black component of the color conversion table is decreased due to the first smoothing process and there is at least one second color component that is less than a threshold value among the other color components of the color conversion table,
use (i) the at least one second color component and (ii) the second black component to calculate a component of the color conversion table excluding the at least one second color component and the second black component, and
execute a second update process of updating the color conversion table based on the at least one second color component, the second black component, and the calculated color component.

4. The information processing apparatus according to claim 2, wherein
the processor is configured to, when the first black component of the color conversion table is decreased due to the first smoothing process and there is at least one second color component that is less than a threshold value among the other color components of the color conversion table,
use (i) the at least one second color component and (ii) the second black component to calculate a component of the color conversion table excluding the at least one second color component and the second black component, and
execute the second update process of updating the color conversion table based on the at least one second color component, the second black component, and the calculated color component.

5. The information processing apparatus according to claim 2, wherein
the processor is configured to
execute the second update process when the first black component of the color conversion table is decreased due to the first smoothing process and a difference between the first and second black components before and after the first smoothing process is executed is equal to or greater than a predetermined value.

6. The information processing apparatus according to claim 3, wherein
the processor is configured to
execute the second update process when the first black component of the color conversion table is decreased due to the first smoothing process and a difference between the first and second black components before and after the first smoothing process is executed is equal to or greater than a predetermined value.

7. The information processing apparatus according to claim 4, wherein
the processor is configured to
execute the second update process when the first black component of the color conversion table is decreased due to the first smoothing process and a difference between the first and second black components before and after the first smoothing process is executed is equal to or greater than a predetermined value.

8. The information processing apparatus according to claim 5, wherein
the processor is configured to
execute the second update process when the first black component of the color conversion table is decreased due to the first smoothing process and a difference between the first and second black components before and after the first smoothing process is executed is equal to or greater than a predetermined value.

9. The information processing apparatus according to claim 1, wherein
the processor is configured to
display a screen that accepts an instruction from a user, and
execute the first update process in accordance with the accepted instruction.

10. The information processing apparatus according to claim 2, wherein
the processor is configured to
display a screen that accepts an instruction from a user, and
execute the first update process in accordance with the accepted instruction.

11. The information processing apparatus according to claim 3, wherein
the processor is configured to
display a screen that accepts an instruction from a user, and
execute the first update process in accordance with the accepted instruction.

12. The information processing apparatus according to claim 4, wherein the processor is configured to
display a screen that accepts an instruction from a user, and
execute the first update process in accordance with the accepted instruction.

13. The information processing apparatus according to claim 5, wherein
the processor is configured to
display a screen that accepts an instruction from a user, and
execute the first update process in accordance with the accepted instruction.

14. The information processing apparatus according to claim 6, wherein
the processor is configured to
display a screen that accepts an instruction from a user, and
execute the first update process in accordance with the accepted instruction.

15. The information processing apparatus according to claim 7, wherein
the processor is configured to
display a screen that accepts an instruction from a user, and
execute the first update process in accordance with the accepted instruction.

16. The information processing apparatus according to claim 8, wherein
the processor is configured to
display a screen that accepts an instruction from a user, and
execute the first update process in accordance with the accepted instruction.

17. The information processing apparatus according to claim 2, wherein
the processor is configured to
display a screen that accepts an instruction from a user, and
execute the first update process or the second update process in accordance with the accepted instruction.

18. The information processing apparatus according to claim 3, wherein
the processor is configured to
display a screen that accepts an instruction from a user, and
execute the first update process or the second update process in accordance with the accepted instruction.

19. An image forming apparatus comprising:
an image forming unit; and
a hardware processor configured to
display a screen that accepts an instruction from a user,
execute a first smoothing process of smoothing a first black component of a first grid point of a color conversion table in accordance with the accepted instruction, the first smoothing processing including replacing the first black component with a second black component that is a weighted average value of (i) the first black component and (ii) other black components of other grid points located around the first grid point,
use the second black component to calculate other color components of the color conversion table for the first grid point,
execute a first update process of updating the color conversion table based on (i) the second black component and (ii) the calculated other color components, and
acquire image data representing an image, wherein
the image forming unit forms the image on a medium using (i) the image data and (ii) the color conversion table for which the first update process is executed.

20. A non-transitory computer readable medium storing a program that causes a computer having a hardware processor to execute information processing, the information processing comprising:
executing a first smoothing process of smoothing a first black component of a first grid point of a color conversion table, the first smoothing processing including replacing the first black component with a second black component that is a weighted average value of (i) the first black component and (ii) other black components of other grid points located around the first grid point;
calculating other color components of the color conversion table for the first grid point based on the second black component; and
executing a first update process of updating the color conversion table based on the second black component and the calculated other color components.

* * * * *